March 21, 1961   C. D. SICK   2,975,427
SHIELD
Filed Feb. 18, 1959
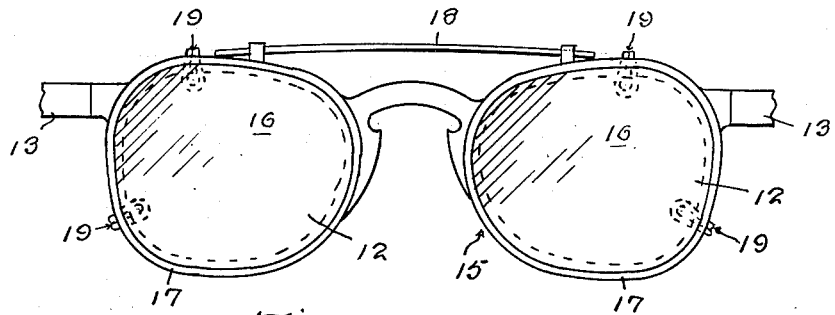
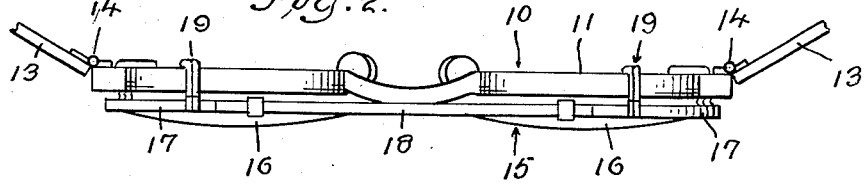
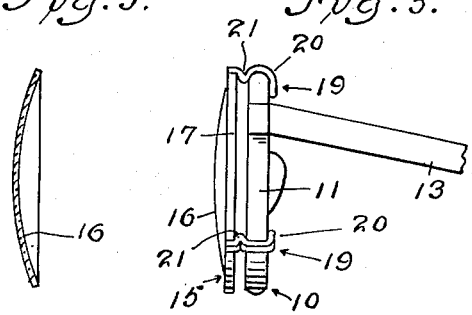
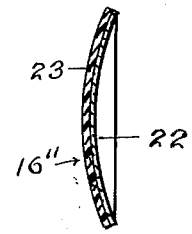
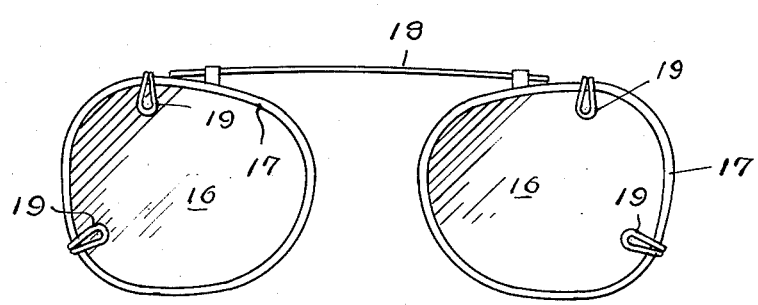
INVENTOR.
Charles D. Sick
BY
Victor J. Evans & Co.
ATTORNEYS

United States Patent Office 2,975,427
Patented Mar. 21, 1961

2,975,427
SHIELD
Charles D. Sick, Onawa, Iowa
Filed Feb. 18, 1959, Ser. No. 794,141
1 Claim. (Cl. 2—14)

This invention relates to a shield, and more particularly to a shield for glasses such as eyeglasses.

The object of the invention is to provide a shield which is adapted to be worn over glasses such as eyeglasses so that workmen wearing such glasses will be offered protection from flying particles, foreign matter or the like.

Another object of the invention is to provide a shield which can be readily clamped onto a pair of eyeglasses when the shield is to be used for protecting the eyeglass lenses from flying particles, and wherein when the shield is not needed, it can be readily removed, the shield when being used serving to prevent breakage or other damage to the eyeglass lenses.

A further object of the invention is to provide an eyeglass shield which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the shield of the present invention attached to a pair of eyeglasses;

Figure 2 is a top plan view of the assembly of Figure 1;

Figure 3 is a side elevational view of the assembly of Figures 1 and 2;

Figure 4 is a rear elevational view showing the shield per se;

Figure 5 is a sectional view taken through one of the transparent members that form the shield and wherein the member shown in Figure 5 may be made of glass;

Figure 6 is a view similar to Figure 5 but showing a modification wherein the transparent shield is made of plastic;

Figure 7 is a view similar to Figures 5 and 6 but showing a further modification wherein the transparent portion of the shield is made of plastic coated glass.

Referring in detail to the drawings, the numeral 10 indicates a pair of eyeglasses which includes a frame 11 as well as spaced apart lenses 12, and temples 13 which are hingedly connected to the frame 11 as at 14.

The numeral 15 indicates the shield of the present invention which is adapted to be used for protecting the lenses 12, and the shield 15 includes a pair of transparent body members or lenses 16 which are arranged directly in front of the lenses 12 when the shield 15 is being used. A bead or rim 17 surrounds each body member 16, and a bar 18 serves to connect the rims 17 together.

There is further provided a means for detachably connecting the shield 15 to the eyeglasses 10, and this means comprises a plurality of clamps which are each indicated by the numeral 19. The clamps 19 are secured to or formed integral with the rims 17, and the clamps 19 are adapted to releasably engage the frame 11 of the eyeglasses 10. As shown in Figure 3 for example, each clamp 19 includes a curved finger 20 as well as an offset portion or shoulder 21 whereby a portion of the frame 11 can be conveniently and readily gripped and held therein.

As shown in Figure 5, each of the lenses or members 16 of the shield 15 may be made of a suitable transparent material such as glass. Or, as shown in Figure 6 the member 16' may be made of plastic, or as shown in Figure 7 a member 16" may be plastic coated glass and wherein in Figure 7 the numeral 22 indicates the glass which is coated with plastic as at 23.

From the foregoing, it is apparent that there has been provided a shield which is especially suitable for use in protecting the lenses of eyeglasses, as for example when such glasses are being worn by workmen. According to the present invention, when a person is working in areas where there are flying particles, objects or the like, the shield 15 is readily attached to the conventional eyeglasses 10 as shown in Figures 1, 2 and 3 for example, and the clamps 19 include the curved portions 20 which grip the eyeglass frames 11 so as to maintain the shield 15 connected to the eyeglasses 10. The temples 13 are arranged in the usual manner. It will be seen that with the shield 15 arranged in front of the eyeglasses 10, the transparent lens members 16 will protect the expensive lenses 12 so that in the event that a particle flies towards the lenses 12, the members 16 will intercept such flying particles and prevent such particles from breaking or cracking or otherwise damaging the lenses 12 of the eyeglasses 10. When the shield 15 is not needed, it can be readily removed from the eyeglasses 10.

The members 16 may be made of glass as shown in Figure 5, or they may be made of a suitable transparent plastic as indicated by the numeral 16' in Figure 6, or they may be made of plastic coated glass as indicated by the numeral 16" in Figure 7.

The parts can be made of any suitable material and in different shapes or sizes.

The shield of the present invention is especially suitable for use by workmen such as welders, persons operating grinding machines or the like. For example, persons working in such jobs are often exposed to flying particles and when such persons are wearing glasses, expensive lenses are broken or pitted and need to be replaced. The shield of the present invention will prevent damage to the eyeglasses or other glasses being worn, and the shield can be used for prescription as well as safety glasses.

Minor changes in shape, size and rearrangement of details coming within the field of invention claimed may be resorted to in actual practice, if desired.

I claim:

In eyeglasses embodying a pair of spaced apart lenses, a frame and temples, a shield embodying a pair of spaced apart transparent body members disposed forwardly of said lenses, a rim surrounding each body member, a bar connecting said rims together, said bar being connected to said rims at points adjacent the upper edges of the rims, a pair of spaced apart clamps affixed to each rim, said clamps releasably engaging said frame, a clamp of each pair being positioned at the top of a rim, and the other clamp of each pair being arranged adjacent a lower outer edge portion of a rim, each of said clamps including a curved finger, each clamp having an offset portion which provides a shoulder, the shoulder and finger being disposed in spaced apart relation relative to each other and the shoulder being positioned between the eyeglasses and shield.

References Cited in the file of this patent
UNITED STATES PATENTS

| | | |
|---|---|---|
| 2,132,346 | Richards | Oct. 4, 1938 |
| 2,574,639 | Goldschmidt et al. | Nov. 13, 1951 |
| 2,607,918 | Gruber | Aug. 26, 1952 |

FOREIGN PATENTS

| | | |
|---|---|---|
| 515,366 | Belgium | Nov. 29, 1952 |